(12) United States Patent
Dinant

(10) Patent No.: US 6,688,762 B2
(45) Date of Patent: *Feb. 10, 2004

(54) VEHICLE LIGHT WITH HIGH RESISTANCE TO HEAT

(75) Inventor: Franck Dinant, Bobigny Cedex (FR)

(73) Assignee: Valeo Vision, Bobigny (FR)

( * ) Notice: Subject to any disclaimer, the term of this patent is extended or adjusted under 35 U.S.C. 154(b) by 171 days.

This patent is subject to a terminal disclaimer.

(21) Appl. No.: 09/841,989

(22) Filed: Apr. 25, 2001

(65) Prior Publication Data

US 2002/0001199 A1 Jan. 3, 2002

(30) Foreign Application Priority Data

Apr. 28, 2000 (FR) .............................................. 00 05496

(51) Int. Cl.⁷ ................................................. B60Q 1/04
(52) U.S. Cl. ........................ 362/547; 362/294; 362/373
(58) Field of Search ............................... 362/294, 516, 362/519, 546, 547, 548, 549, 373, 433, 390, 456, 374, 362

(56) References Cited

U.S. PATENT DOCUMENTS 4,709,305 A * 11/1987 McMahan .................... 362/61
5,113,320 A * 5/1992 Haydu ......................... 362/61

FOREIGN PATENT DOCUMENTS

| DE | 3616694 | 11/1987 |
| DE | 3620800 | 12/1987 |
| EP | 0 512 793 A2 | 11/1992 |
| FR | 2 544 463 | 10/1984 |
| GB | 2 022 234 | 12/1979 |
| GB | 2 070 755 | 9/1981 |

OTHER PUBLICATIONS

French Search Report dated Jan. 3, 2001.

* cited by examiner

Primary Examiner—Sandra O'Shea
Assistant Examiner—Hargobind S. Sawhney
(74) Attorney, Agent, or Firm—Morgan & Finnegan LLP

(57) ABSTRACT

A vehicle foglight, or other light for illuminating or signalling purposes, has a casing and a reflector, with a cradle which connects the reflector to the casing and which has an aperture in its upper part such that the cradle is U-shaped. The lamp is mounted in the aperture and the rear wall of the casing carries a metal plate. Heat from the lamp is dissipated so that plastics components are not unduly heated.

11 Claims, 11 Drawing Sheets

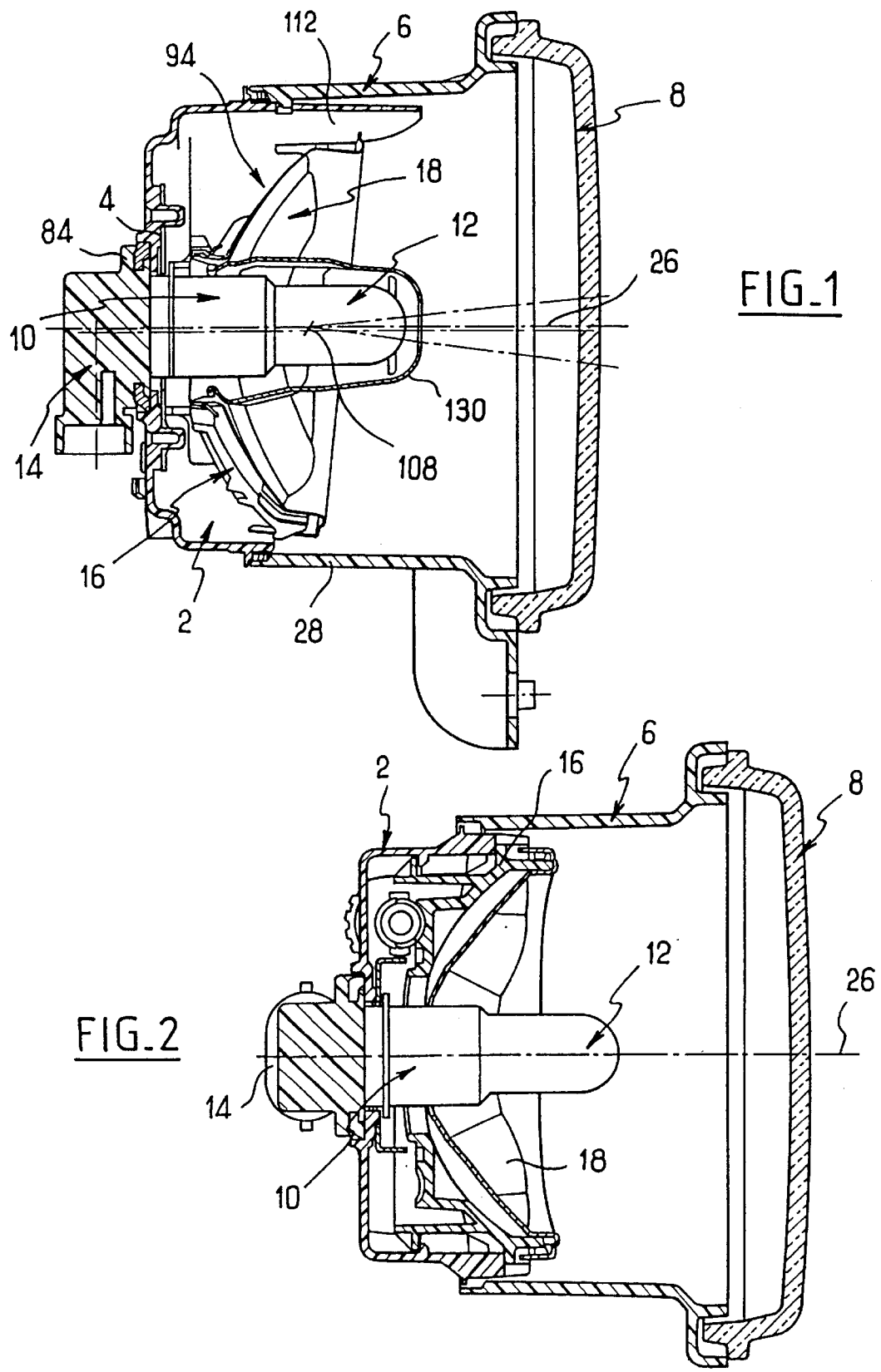

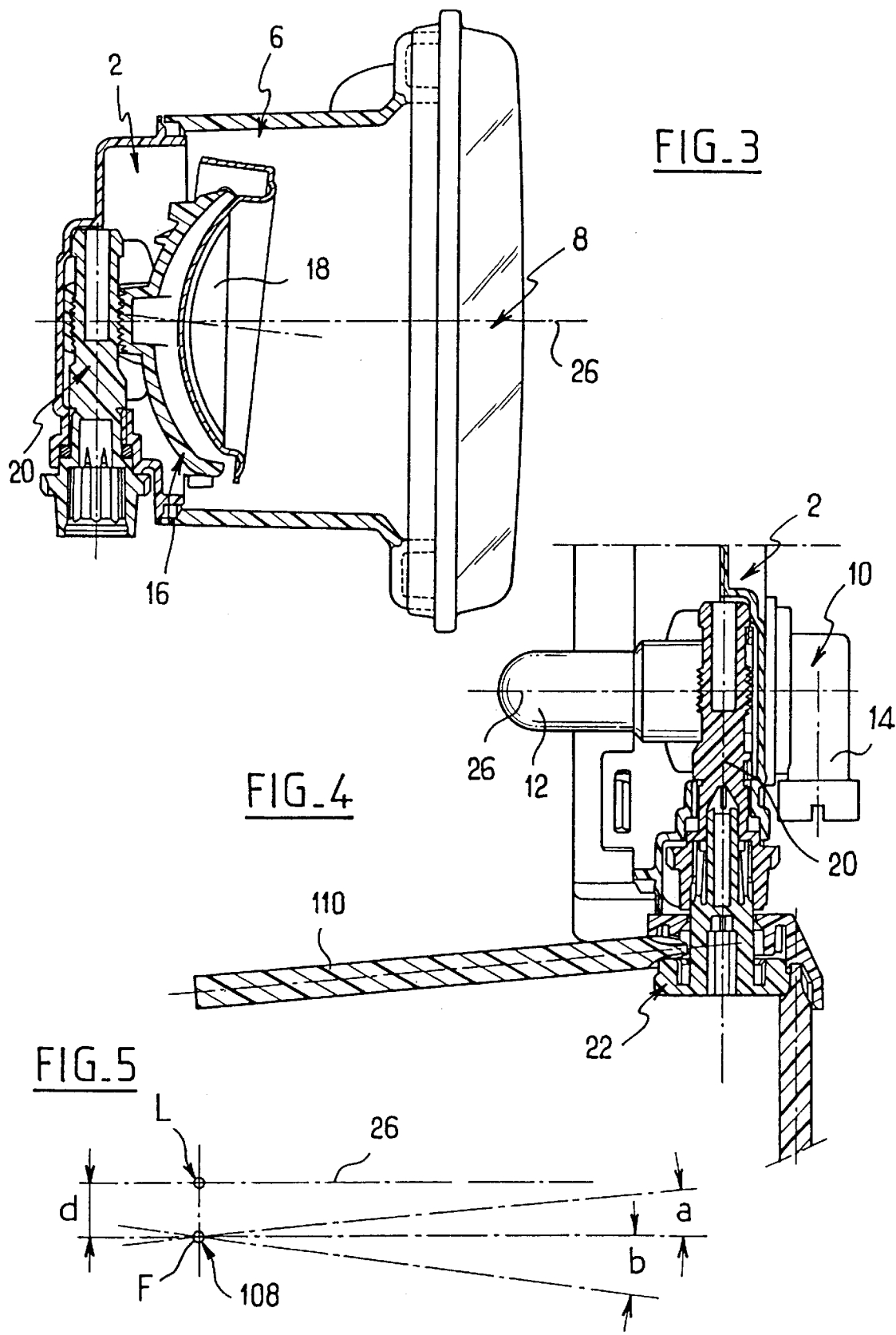

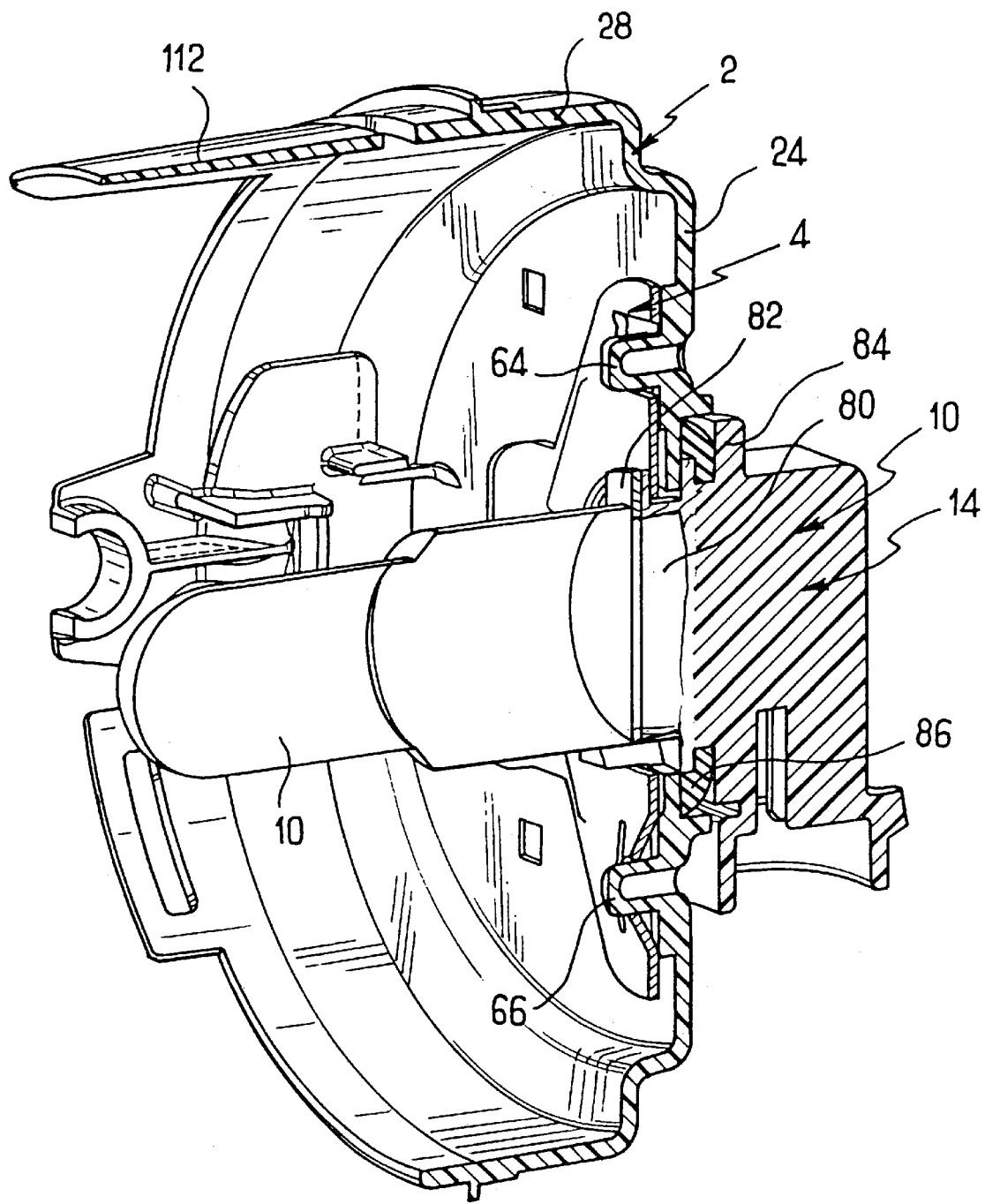
FIG_6

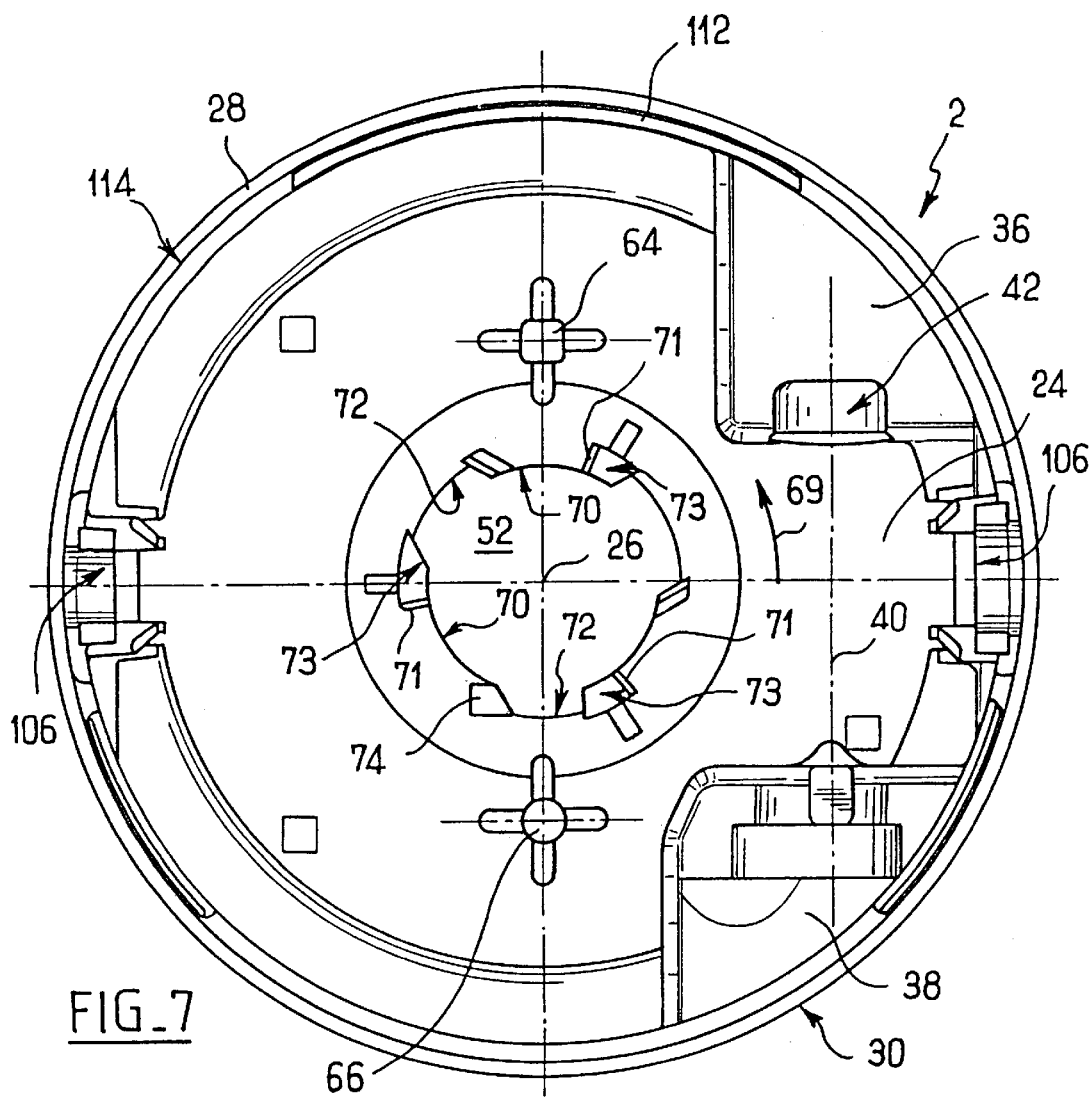
FIG_7
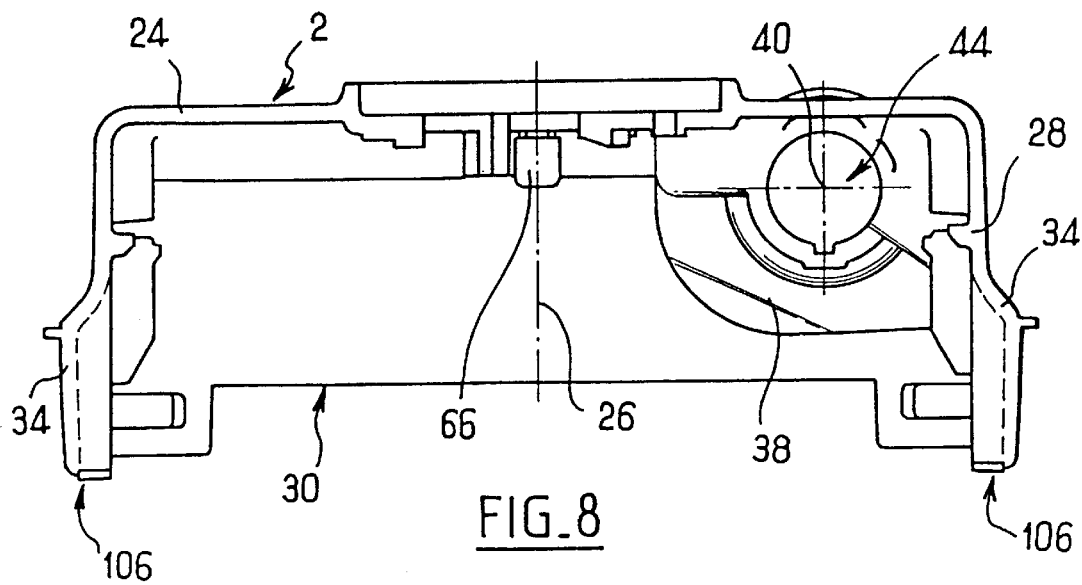
FIG_8

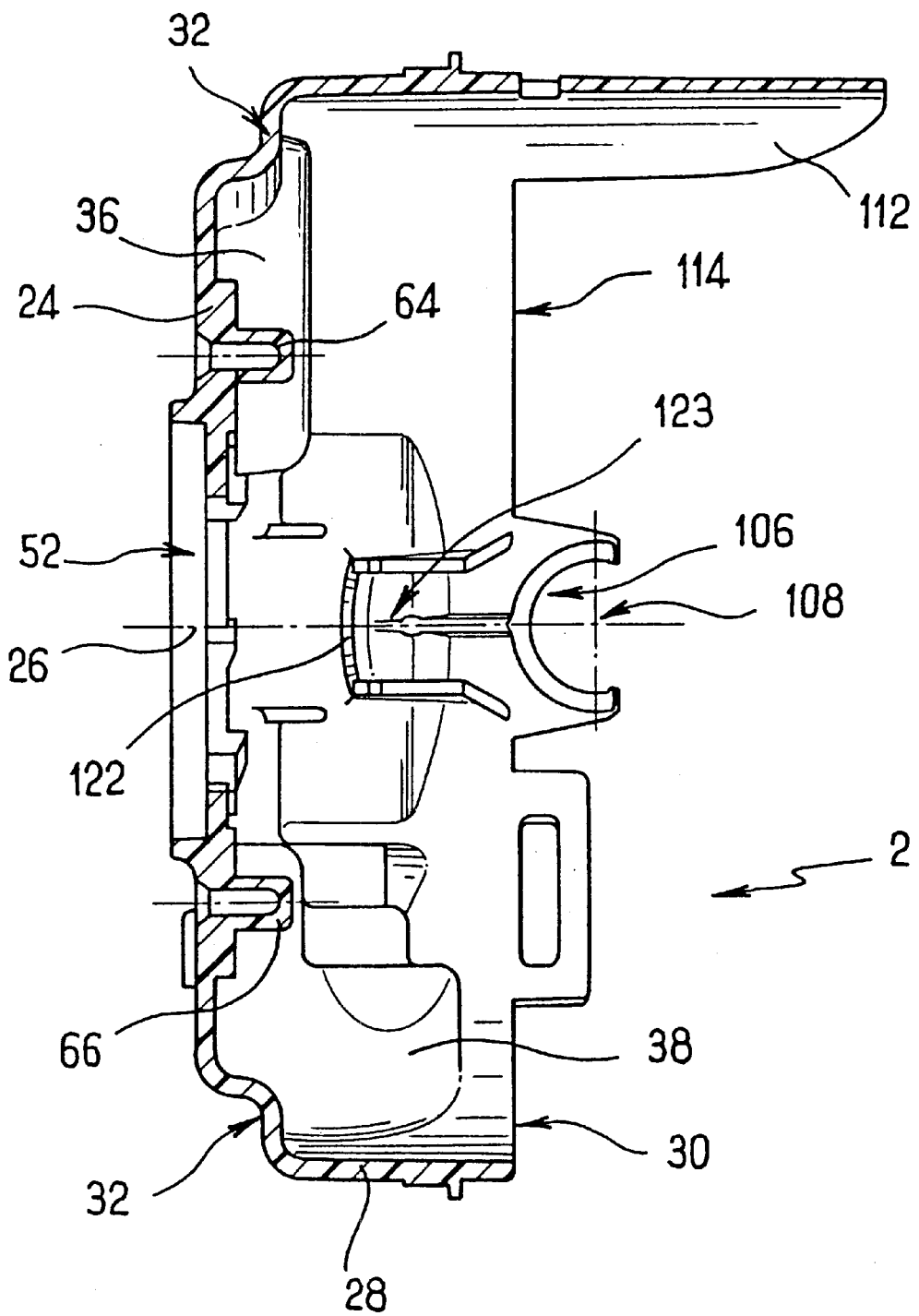
FIG_9

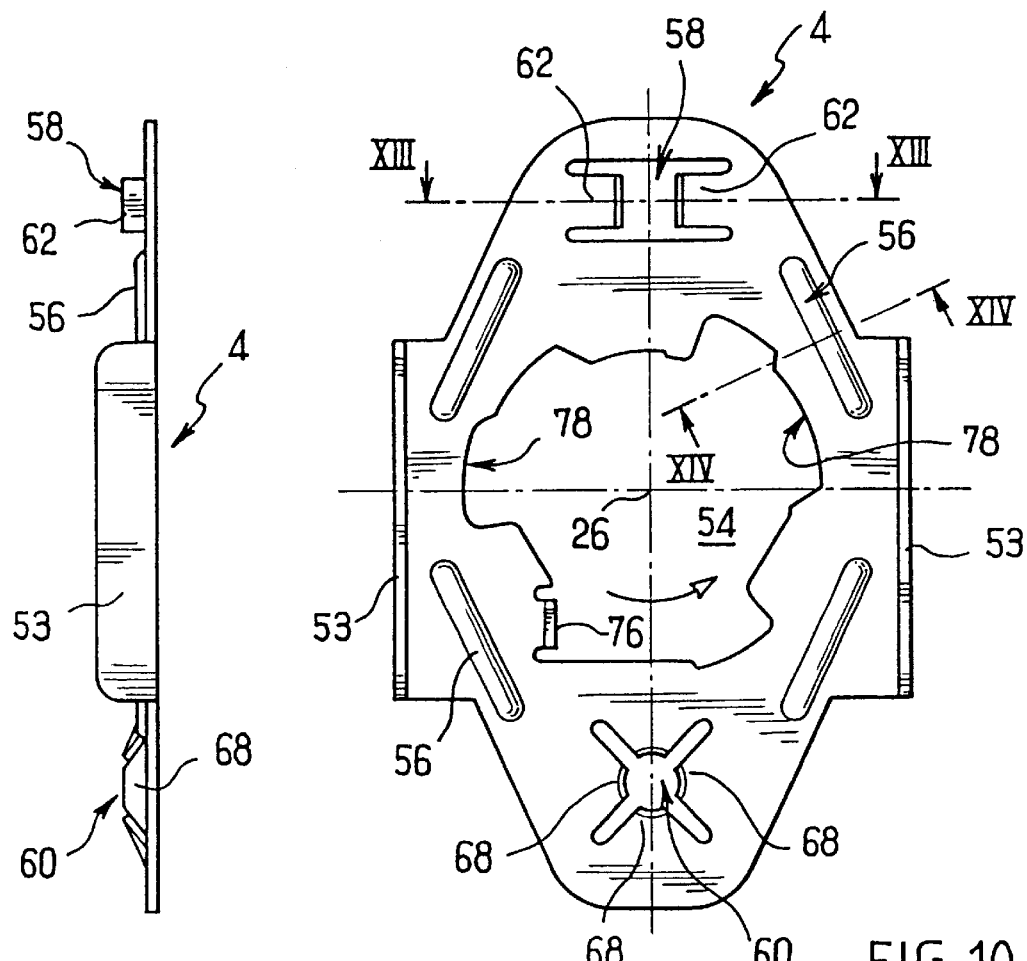
FIG_11
FIG_12
FIG_10
FIG_13
FIG_14

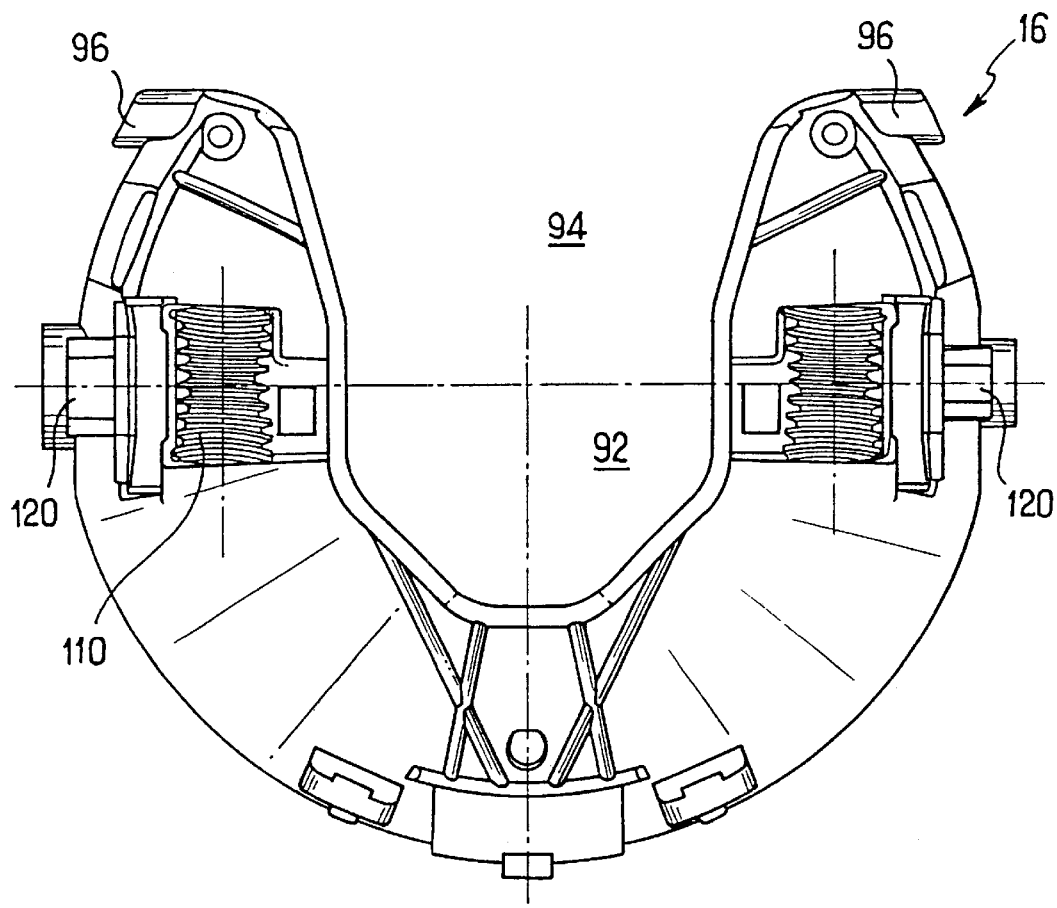
FIG_15
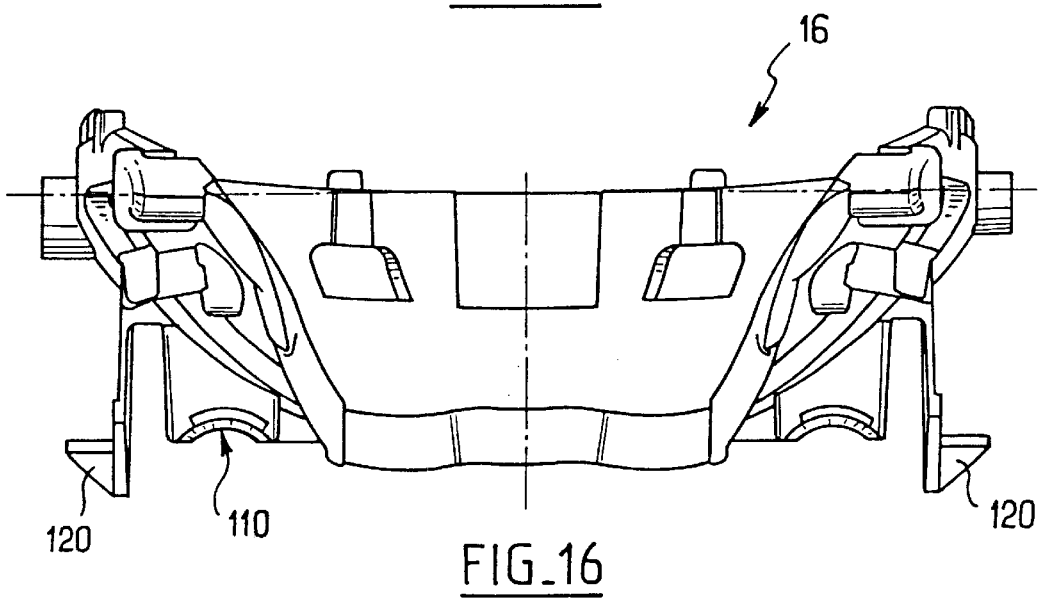
FIG_16

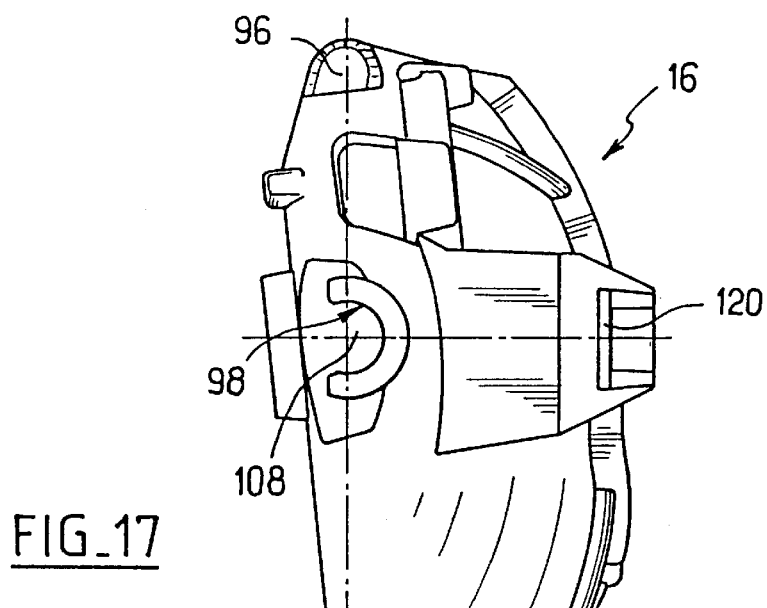
FIG_17
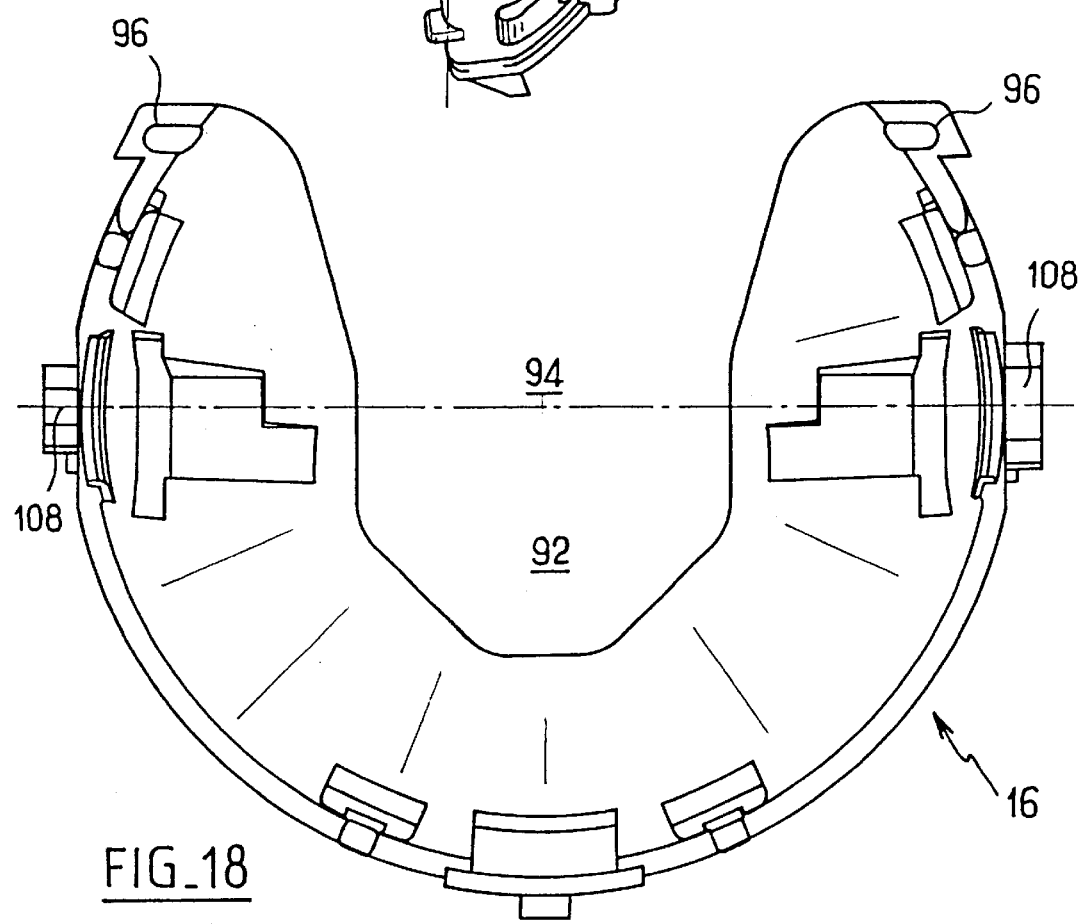
FIG_18

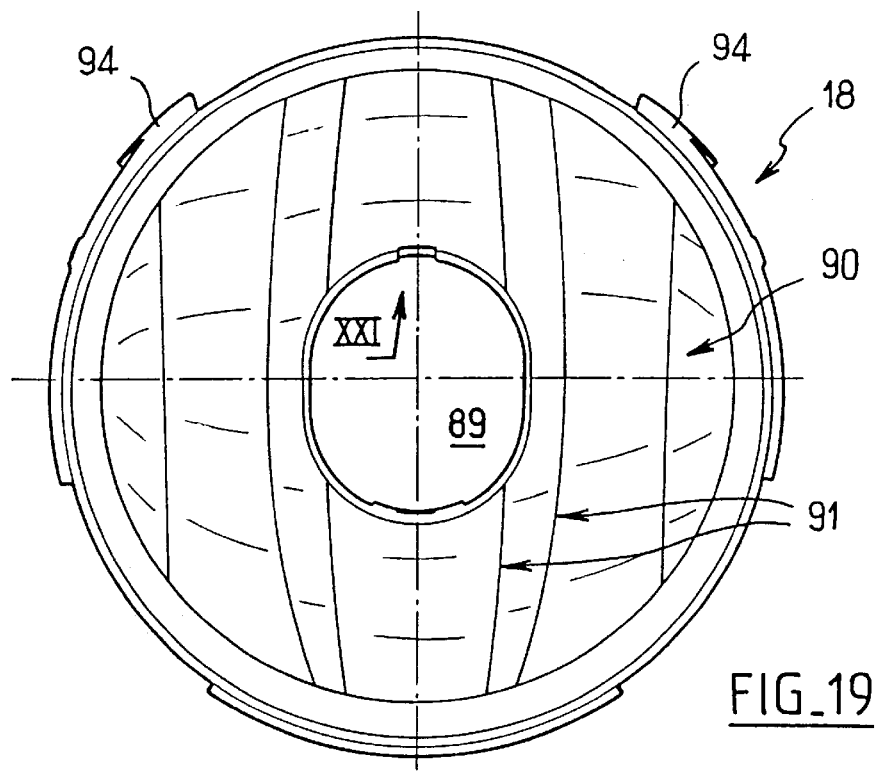
FIG_19
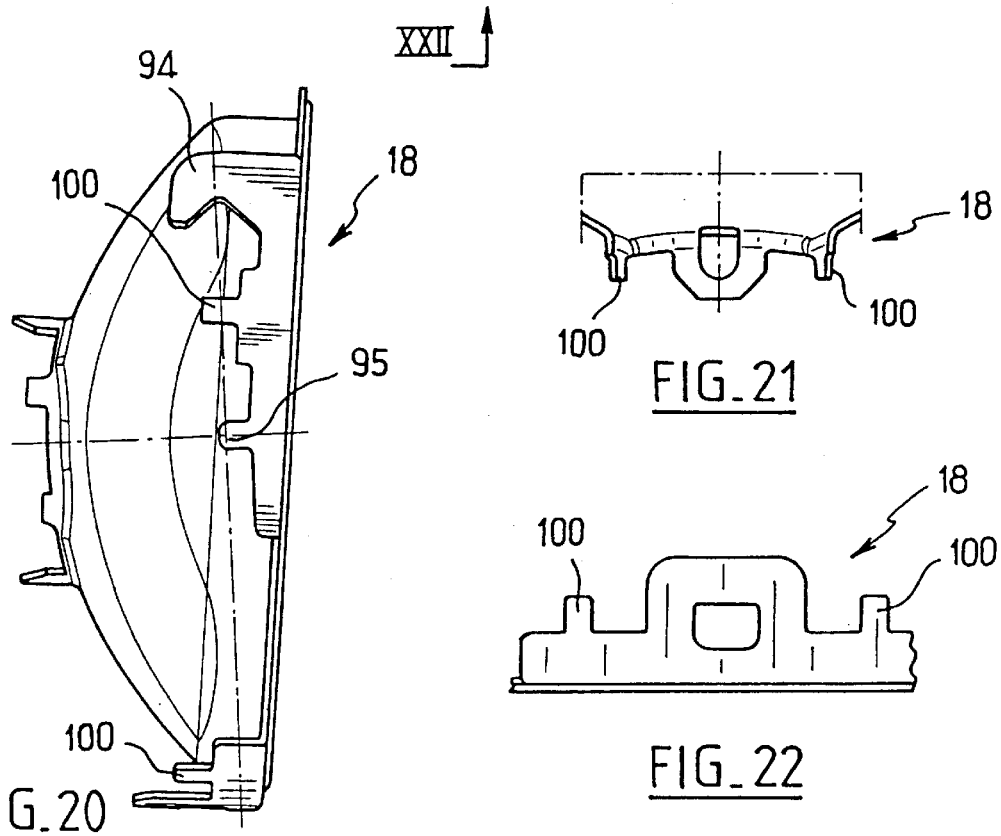
FIG_20
FIG_21
FIG_22

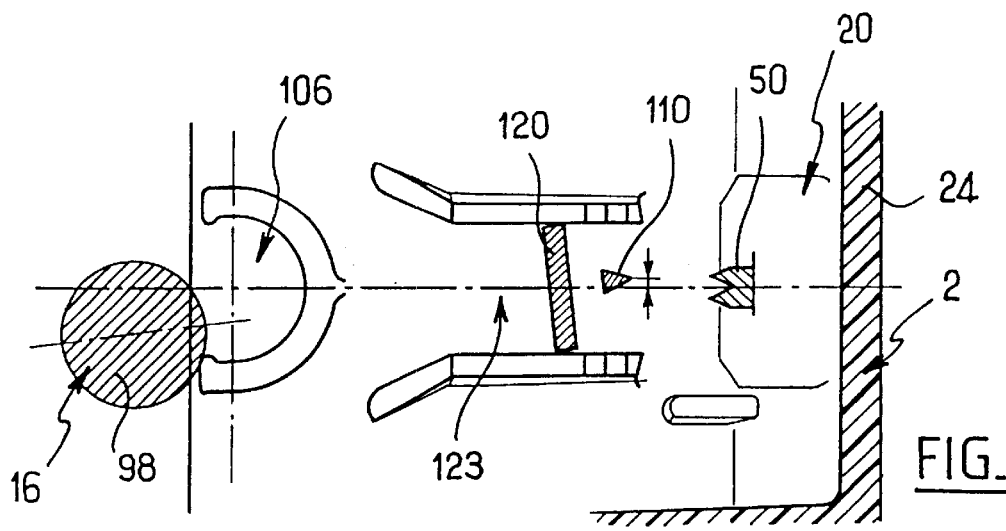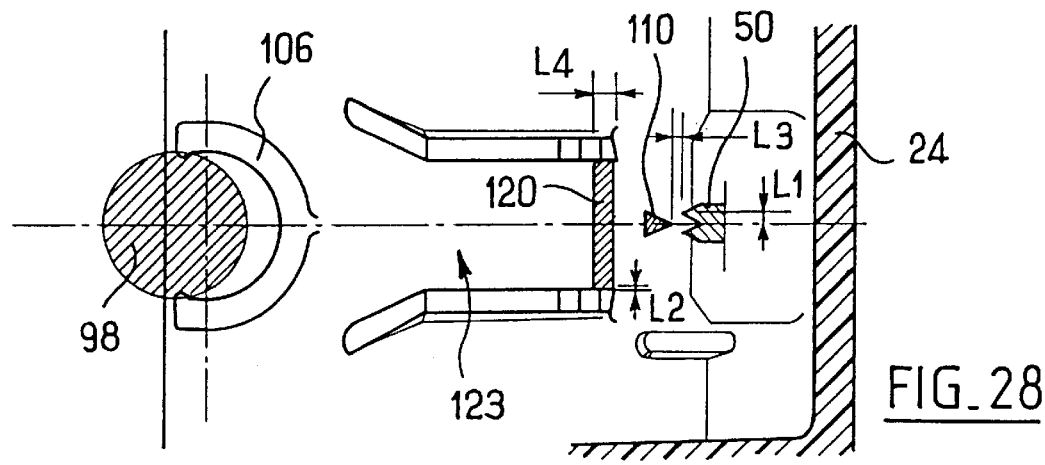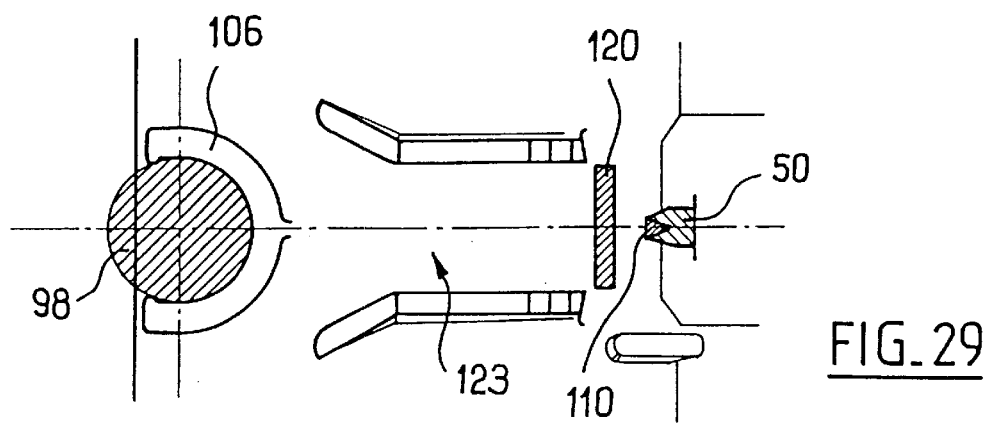

VEHICLE LIGHT WITH HIGH RESISTANCE TO HEAT

FIELD OF THE INVENTION

This invention relates to lights, especially for a motor vehicle, in particular where the purpose of the light is to provide illumination, but also including lights having as their only or primary purpose the giving of an indication or signal. These various kinds of lights will be referred to generically in this Application, for convenience, as headlights.

BACKGROUND OF THE INVENTION

European published patent specification No. 0 847 894 discloses an illuminating or signalling device for a vehicle which comprises a casing, a fixed lamp and a reflector mounted for movement in the casing and being directly connected to the casing. In some applications, particularly in a foglight, the temperature in the upper part of the reflector can reach more than 200° C. Such a temperature can cause deformation and softening of some of the components of the headlight, particularly if they are of plastics material. The connection between the reflector and casing is particularly critical in this regard, and this effect is increased the more the movement of the reflector with respect to the lamp has to be accurate enough to give a correct beam under all circumstances.

DISCUSSION OF THE INVENTION

One object of the present invention is to provide a headlight (i.e. an illuminating or signalling device, as defined above) which has increased resistance to heat, especially in the region of the connection between the reflector and the casing.

According to the invention, an illuminating or signalling device for a vehicle comprises a casing and a reflector and is characterised in that it includes a cradle connecting the reflector to the casing and having an aperture in its upper part.

This aperture corresponds to the zone of the cradle which would otherwise be the portion of the latter which is most exposed to heat. In addition, the aperture enables the cradle to undergo some thermal expansion. In this way the thermal resistance of the cradle is improved, which enables the reflector to be well positioned with respect to the lamp. In addition, the aperture which is provided in accordance with the invention reduces the volume of the cradle and gives it a size which enables certain steps in the fitting of the cradle with respect to the reflector to be carried out, for example assembly by pivoting movement, which would otherwise not have been possible.

Moreover, the aperture prescribed by the invention provides an indexing feature for correct mounting of the cradle in the headlight. Finally, it enables the amount of material used to be reduced. This in turn gives a reduction in both weight and cost, considerations which are becoming more important in view of the now current use, for this type of component of plastics materials, of sophisticated compositions which have high heat resistance but which are often difficult to work.

According to a preferred feature of the invention, the said aperture includes a slot.

The cradle may be secured rigidly to the reflector. Alternatively or in addition, the reflector may be mounted so that it is capable of some movement with respect to the casing, such as rotational movement.

According to another preferred feature of the invention, the headlight includes an adjusting screw rotatable on the casing and meshing with a threaded element of the cradle.

The headlight does of course include a light source, referred to herein as a lamp. The lamp may be mounted rigidly on the casing.

The headlight may have a rear wall of plastics material, with a lamp holder fixed to this rear wall and a metal plate fixed to the rear wall. This metal plate reinforces and stiffens the rear wall. The mechanical strength of the rear wall, even under the effect of heat, is thereby increased. Moreover, the metal plate receives some of the heat from the rear wall, and may also even be heated directly by the lamp, to dissipate this heat into the air around the metal plate (which thereby constitutes a radiator). This maintains the rear wall at a relatively low temperature. Deformation of the rear wall is therefore very much reduced, and the positioning of the lamp with respect to the reflector, in order to give a correct beam, is thereby preserved.

The headlight preferably includes a cover glass, and an intermediate member which connects the cover glass to the casing, with a screen extending forward from an upper zone of the casing towards the cover glass. With this arrangement, the screen receives the rising hot air. Some of the heat is then captured by the screen and no longer by the intermediate piece. In this way the risk of deformation of the intermediate piece is reduced. As to the screen, it can be deformed by quite a large amount without adversely affecting operation of the headlight.

In preferred embodiments the headlight is an illuminating device, which may in particular be a foglight.

Further features and advantages of the invention will appear more clearly on a reading of the following detailed description of preferred embodiments of the invention, which is given by way of non-limiting example only and with reference to the accompanying drawings.

BRIEF DESCRIPTION OF THE DRAWINGS

FIG. 1 is a view in cross section on a vertical axial plane of a headlight according to the invention.

FIG. 2 is a view of the headlight of FIG. 1, in cross section taken on a horizontal axial plane.

FIG. 3 is a view of the same headlight as in FIG. 1, in cross section taken on a vertical plane passing through the reflector tilt adjusting screw.

FIG. 4 is a view similar to FIG. 3 showing the operation of the adjusting screw.

FIG. 5 is a geometrical diagram illustrating the angular displacement of the reflector.

FIG. 6 is a view, in cross section and in simplified perspective, of the same headlight as FIG. 1.

FIG. 7 is a front view of the casing of the headlight of FIG. 1.

FIG. 8 is a view of the casing of the headlight in FIG. 1 in axial cross section taken on a horizontal plane.

FIG. 9 is a view in axial cross section taken on a vertical plane, showing the casing of FIG. 7.

FIG. 10 is a front view of the press-formed metal plate which is part of the headlight shown in FIG. 1.

FIG. 11 is a bottom plan view of the same plate.

FIG. 12 is a view of the same plate as seen from the left.

FIG. 13 is a scrap view in cross section taken on the line XIII—XIII in FIG. 10.

FIG. 14 is another scrap view, taken on the line XIV—XIV in FIG. 10.

FIG. 15 is a rear view of the cradle in the headlight shown in FIG. 1.

FIG. 16 is a top plan view of the same cradle.

FIG. 17 is a view of the same cradle as FIG. 15, seen from the left.

FIG. 18 shows the same cradle from the front.

FIG. 19 is a front view of the reflector in the headlight of FIG. 1.

FIG. 20 is a view of the same reflector from the left.

FIG. 21 is a view of the reflector seen in the direction of the arrow XXI in FIG. 19.

FIG. 22 shows the same reflector in the direction of the arrow XXII in FIG. 19.

FIGS. 27, 28 and 29 illustrate three steps in the process for assembling the cradle on the casing of the headlight.

DESCRIPTION OF PREFERRED EMBODIMENTS OF THE INVENTION

Figure 23:
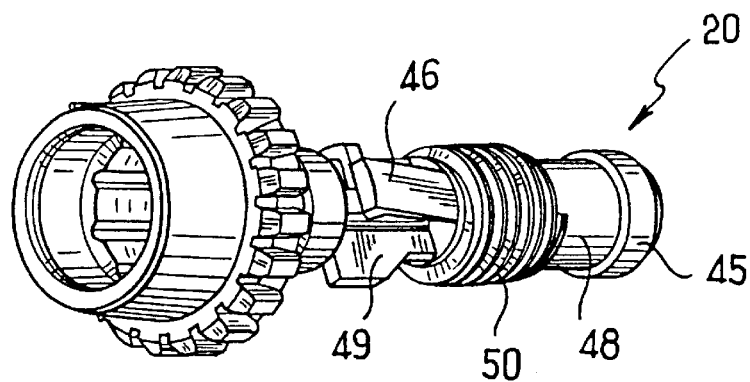
FIG. 23 is a perspective view of the adjusting screw in the headlight shown in FIG. 1.

Reference is first made to FIGS. 1 to 3. In this description, the headlight is in fact a fog penetrating light, or foglight, unit. It comprises a casing at the rear of the unit, a press-formed metal plate 4 fixed to the casing, an intermediate piece 6 fixed to the casing, and a front glass 8 fixed to the intermediate piece 6. The headlight also includes a lamp holder 10 fixed to the casing and to the plate 4, a lamp 12 and a connector 14, the lamp and connector being fixed to the lamp holder. The unit also includes a cradle 16 which is fixed to the casing, and a reflector 18 fixed to the cradle. It further includes an adjusting screw 20 and an adjusting knob 22 which is fixed to the screw 20, as can be seen in particular in FIG. 4. These various parts of the light will now be described in greater detail.

Accordingly, reference is now made to FIGS. 7 to 9. The casing 2 essentially consists of a base wall 24 which is generally flat and at right angles to a horizontal axis 26 of the lamp, together with a cylindrical side wall 28 which extends forward from the base wall. The side wall 28 has a circular front edge 30 lying in a plane at right angles to the axis 26. As can be seen in FIG. 9, the casing has shoulders 32 in certain positions at the junction between the base wall 24 and the side wall 28. In addition, the side wall 28 is divergent at certain places 34 as shown in FIG. 8.

With reference in particular to FIG. 7, at the junction between the base wall 24 and the side wall 28 the casing 2 has two blister portions, namely an upper blister portion 36 and a lower blister portion 38, which are arranged in the first and fourth quadrants respectively in front view. These blister portions are generally in the form of isosceles right-angled triangles, as can be seen in the front view in FIG. 7. They define portions that project inwardly of the light. The two blister portions 36 and 38 have two apertures facing each other on a common vertical axis 40 which is at right angles to the axis 26 but does not intersect the latter. The aperture 42 in the upper blister portion 36 is open downwards, but is blind upwards. It is open in the forward direction, while the aperture 44 in the lower blister portion is open upwards and downwards but closed at the sides.

Figure 24:
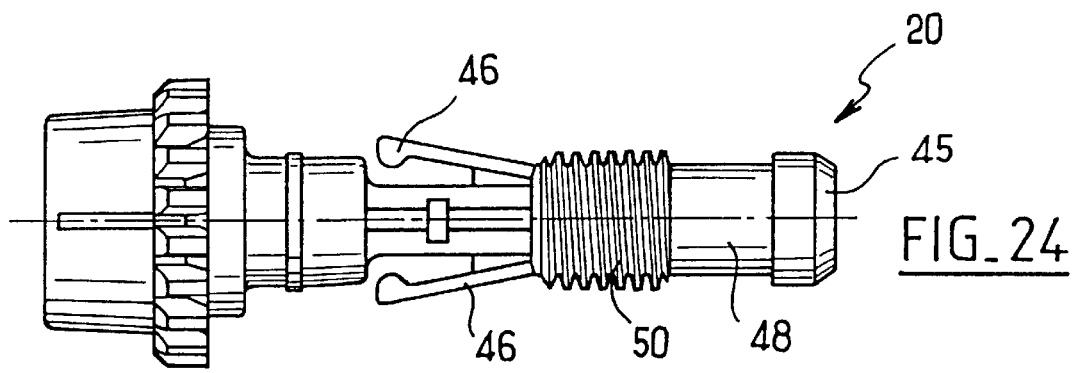
FIG. 24 is a side view of the same adjusting screw.
Figure 25:
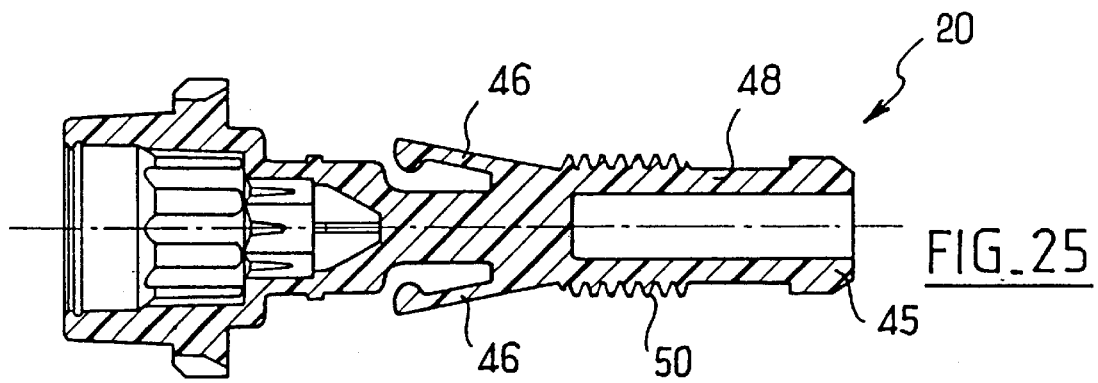
FIG. 25 is a view of the same adjusting screw in axial cross section.
Figure 26:
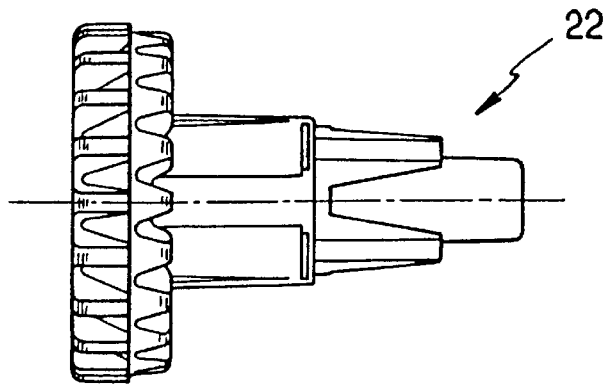
FIG. 26 is a side view of the adjusting knob associated with the above mentioned adjusting screw.

The apertures 42 and 44 are arranged to receive the adjusting screw 20. This screw is shown in detail in FIGS. 23 to 25, to which reference is now made. The screw is engaged by means of its upper end 45 in the lower aperture 44, and then as far as the upper aperture 42. Elastic lugs 46 are connected by their front ends to the body 48 of the screw 20. In the rest condition, these lugs are spaced away from the body 48 of the screw towards the rear, as is clearly shown in FIG. 25. The lugs 46 flex during the passage through the aperture 44, and then regain their initial position after the screw has reached its operating position. These clipping lugs therefore prevent the screw from being withdrawn downwards. The screw is in axial abutment at the top against the base of the blind upper aperture 42. The screw is guided in rotation about its axis in both apertures. Between these apertures the body 48 of the screw has a threaded portion 50 which enables the reflector to be displaced, as will be seen later herein. This position of the screw guarantees the proper angular positioning of the thread and therefore precise cooperation with the cradle of the headlight.

The screw 20 also includes a locating lug 49 which projects radially on one side of the shank of the screw only, and which ensures that the screw can only be mounted in its correct position on the casing, otherwise it would be unable to be received on the casing because the locating lug would abut against the casing.

The rear wall of the casing has a central aperture 52, FIG. 7, which is occupied by the lamp holder 10.

Referring now to FIG. 10, the metal plate 4 is generally flat and consists essentially of a lozenge with a vertical major axis. The metal plate is centred on the axis 26 of the lamp. The plate 4 has two straight vertical side edge portions 53 which are bent forward and which lie at right angles to the plane of the plate, extending forward about 3 mm. The metal plate 4 has a central aperture 54 which is of substantially the same form and dimensions as the aperture 52 in the rear wall of the casing, with which the aperture 54 is in register. The metal plate 4 is fixed to the rear wall 24, facing the front face. The metal plate is interposed axially between the rear wall 24 on the one hand, and the cradle 16 and reflector 18 on the other hand. The metal plate has stiffening ribs 56, of which there are four in this example, in relief on the front face of the metal plate. These ribs are parallel to the respective inclined faces of the lozenge.

The metal plate has two further apertures, namely an upper aperture 58 and a lower aperture 60, which are designed to cooperate with fingers which project forward from the rear wall 24 of the casing. The upper hole 58 has the form of an H on its side. It consists of a rectangular pressed-out portion in which two rectangular tongues 62 extend horizontally towards each other. These two tongues are slightly inclined forward as shown in FIG. 13. The finger 64 of the casing associated with this aperture has a profile form in square section in a plane at right angles to the axis 26. It is so dimensioned that when the metal plate 4 is placed in position against the rear wall 24, the finger 24 penetrates into the aperture 58 between the tongues 62, with the side faces of the finger rubbing against the tongues or even bending them forward. On the other hand, having regard to the forward inclination of the tongues, the friction forces of the tongues on the finger, preventing it from returning, are much higher than those encountered during its advance. The finger is therefore blocked against movement in the aperture, and so prevents it from returning.

The cooperation between the lower aperture 60 and the associated finger 66 is based on the same principle. The finger 66 has a circular transverse cross section. The aperture 60 is cruciform and defined by four triangular tongues 68, the facing edges of which define the cross. The point of the tongues is rounded and concave so as to match the curvature of the finger. The tongues 68 are further inclined forward as shown in FIG. 11. Here again, the tongues enable the finger 66 to be introduced forward into the aperture, but essentially prevent it from being withdrawn. The two pairs of fingers and apertures ensure rigid fastening of the metal plate 4 to the rear wall 24. The square cross section of the upper finger 64 is larger than that of the lower finger 66, so that the upper finger 64 is unable to be introduced into the lower aperture 60 without abnormal force. In addition, the inclination of the tongues prevents the metal plate from being fixed to the rear wall in such a position that the tongues are inclined towards the rear. An indexing or locating means is thereby provided, such that the metal plate 4 can only be mounted on the casing in the correct attitude.

With reference to FIG. 7, the aperture 52 in the casing essentially has three arcuate portions 70 of the same radius. These are arranged alternately with three arcuate portions 72 of the same radius as each other, which is larger than the radius of the portions 70. All of the portions 70 and 72 are centred on the axis 26.

In the interests of clarity in the following description, the six arcuate portions 70, 72 will be regarded as divided into three pairs of adjacent arcuate portions. The portions 70 will be called small arcs and the portions 72 will be called large arcs. Each of these pairs consists of a large arc 72 followed by a small arc 70, with reference to the trigonometric direction indicated at 69 in FIG. 7. The casing includes a relief 72 which projects forward from the front face of the rear wall at the junction between the two arcs of each pair. This relief 71 includes a front helical ramp 73 on the axis 26, which is distanced from the rear wall by the amount of rotation in the direction 69. The rear wall also includes a relief 74 which extends to the edge of the aperture 52 between two reliefs 72.

The metal plate 4 has, close to its aperture 54, a bent-back edge 76 which abuts against the relief 74 against the rotation of the plate 4 with respect to the rear wall in the direction 69. The arcuate portions, or large arcs, 78 of the metal plate 4, which are homologous with the large arcs 74 of the casing rear wall, are longer than the latter so that they do not mask the ramps 73 as seen from the front.

Reference is now made to FIG. 6. This shows the lamp holder 10 which has a body 80 in the general form of a body of revolution, with three tongues 82, only one of which, namely an upper tongue, is shown. These tongues project radially from the periphery of the body 80. The body 80 includes a double collar portion 84 at the rear, and a sealing ring 86 is fitted against this collar portion. The ring 86 also takes up clearances.

It will be supposed that the lamp holder 10 carries the lamp 86 and that the casing 2 carries the metal plate 4. In order to fix the lamp holder to the casing, the lamp holder is introduced from the rear into the aperture 52 in the rear wall and in the plate 4, until the seal 86 comes into axial abutment at the front on the rear face of the rear wall, the collar portion 84 being itself in axial abutment against the back side of the sealing ring. In the course of this movement, the tongues 82 have to pass through the aperture, in facing relationship with the circular arcs of large radius, because they extend radially over too great a length to be able to penetrate in line with the small arcs. In addition, because of the presence of the relief 74, one of the places for passage of the tongues is smaller than the others. Given that the tongues 82 have dimensions corresponding substantially to those of the passage locations, it follows that the lamp holder is unable to penetrate into the aperture except in one single angular position about the axis 26 with respect to the casing. In this way, an indexing effect is once again obtained. Once the seal is in abutment against the rear wall, the tongues lie directly facing the ramps 73. The lamp holder is then pivoted with respect to the casing about the axis 26 in the direction 69. The tongues 82 then follow the ramp 73 so that they push the lamp holder forward. The tongues finally leave contact with the ramps so as to come into axial abutment on the metal plate 4 at the level of the small arcs. One of the tongues 82 comes into rotational abutment against the relief 76 of the metal plate, which prevents the lamp holder from rotating and defines its final position. The lamp holder is thus fixed rigidly to the metal plate 4 and casing 2 in a position which is very accurately defined, due in particular to the guiding of the body 80 of the lamp holder in rotation against the small arcs.

Reference will now be made to FIG. 19 showing the reflector. The reflector is generally concave in form and has an aperture 89 in its centre. Its internal reflective surface 90 has various zones defined by geometrically different paraboloids, which are separated from each other by edges 91.

The cradle 16 is shown in FIGS. 15 to 18, to which reference is now also made. The cradle 16 has a shape which is generally similar to that of the reflector, being essentially of concave hemispherical form. It also has a central aperture 92, but this is extended upwards by a slot 94 which joins the central aperture 92 to the peripheral edge of the cradle, so that the cradle is generally U-shaped when seen from the back or the front. The U is essentially solid, apart from the slot 94 and aperture 92.

The reflector 18 is rigidly fixed to the cradle 16 in a coaxial position. The fastening means comprise two lateral positioning hooks 94 at the top of the reflector, which are oriented downwards and which engage on two reliefs 96 of the cradle. The reliefs 96 are contiguous with the slot 94. The fastening means also comprise two positioning lugs 95, on the left and right hand sides of the reflector, which are received rearwardly in two corresponding housings 98 in the cradle. The two lugs 95 are different from each other, as are the housings 98, so that the reflector is only able to be fixed in one position with respect to the cradle. The fastening means further comprise four lugs 100 of the reflector which are bent back radially inwards in the cradle, and finally a bottom clipping lug 102 of the reflector which is clipped over a bottom spigot 104 of the cradle. These different means provide robust and precise fastening of the reflector on the cradle.

In order to secure the cradle to the reflector, the reliefs 96 of the cradle are engaged under and in the hooks 94 of the reflector, the cradle being inclined with respect to the reflector. The cradle is then moved back towards the reflector by bringing their lower parts towards each other so as to eliminate the tilt, the lugs 95 then penetrating into the housings 98 in the cradle, while the lug 102 becomes clipped over the spigot 104 of the reflector. Although this fastening is already rigid, it is enhanced by bending the lugs 100 of the reflector into the cradle. The two components are thereby secured together in a particularly robust way. The space which is defined by the slot 94 makes mounting possible with preliminary rotation.

As shown in FIGS. 27 to 29, the casing 2 has two cylindrical seatings 106 which are adapted to receive the reliefs 98 of the cradle, the latter having a corresponding form so as to guide the cradle in rotation with respect to the casing about a horizontal axis 108 (FIGS. 17 and 18) at right angles to the axis 26 of the lamp, but disposed under the axis 26. The cradle includes two ears 120, FIGS. 15 and 16, which project towards the rear and which are arranged to come into clipping engagement with two reliefs 122 (FIG. 9) on the internal face of the side wall of the casing 2, so that the cradle, which is urged axially rearward in the casing, is clipped in place. The reliefs 122 are curved, with a centre of curvature which is directed forwards as shown in FIG. 9, whereby to enable the cradle 16 to be rotated with respect to the casing 2 despite the above mentioned fastening. The two reliefs 98 are different from each other, as are the housings 106, thereby giving an indexing or locating function whereby the cradle can be mounted on the casing only in the correct position, namely that in which the slot 94 is at the top.

As they are brought towards the relief 122, the ears 120 are guided by a groove 123 (FIG. 9) in the casing. The groove 123 has a flared front end.

On its rear face, the cradle has a generally cylindrical hollow screw thread element 110, FIG. 15, which is so arranged that this screw thread element engages with the thread 50 of the adjusting screw 20 when the cradle is in place. When the adjusting screw is rotated about its axis, for example by means of the knob 22 which is a downward extension of the adjusting screw, the reflector 16 is thereby caused to pivot upwards or downwards about the axis 108. The screw threads of the screw 20 and cradle 16 are arranged to have a clearance between them which is sufficiently large for the rotation of the cradle over a small angle not to interrupt the engagement of the screw threads. In addition, the screw thread element 110 in the cradle has a profile which is slightly convex when seen in vertical cross section on a plane passing through the axis of the screw thread.

Reference is again made to FIGS. 27 to 29, which show in particular the steps in the fitting of the cradle on the casing. While the cradle is being offered up to the casing, the ears 120 are guided into the grooves 123 before the reliefs 98 are received in the seatings 106 (FIG. 27). When the reliefs 98 arrive within the seatings 106, the ears are still in the grooves (FIG. 28). At this instant, the axis of the cradle is already suitably positioned with respect to the axis of the casing. In addition, the vertical clearance L2 between the ear and the groove is smaller than the vertical clearance between the screw threads 110 and 50. Moreover, the horizontal distance L3 between the apex of the thread 100 and the apex of the thread 50 is smaller than the distance L4 through which the ear still has to travel in order to leave the groove 123.

When the reliefs are received in the seatings 106 as in FIG. 29, the screw threads 50 and 110 are in engagement with each other, but the ears 120 have left the grooves 123, thereby enabling the cradle to pivot with respect to the casing on actuation of the adjusting screw. It can be seen that this arrangement ensures that the cradle comes into the correct position on the casing.

FIG. 5 shows the movement of the cradle 16 with respect to the casing 2. The cradle may, in this example, be inclined from the horizontal by an angle a of 5.5° upwards and an angle b of 7.5° downwards, so as to correct the angle of the beam of the headlight with reference to the actual attitude of the vehicle on the ground. The focus F of the reflector 18 is situated on the pivot axis 108, vertically in line with the axis 26 of the lamp and casing. The vertical distance d separating them is very much reduced, for example by 0.7 mm. In FIG. 5, the centre of the filament is indicated at L. The lower generatrix of the horizontal cylindrical filament, extending from front to rear, has its centre substantially at the focus F.

With reference to FIG. 4, the knob 22 has an upwardly oriented circular set of teeth, whereby it meshes with an elongate toothed member 130 such as a cruciform screwdriver, for actuating the adjusting screw 20 and adjusting for attitude, for example manually or automatically from the fascia panel. Actuation by means of the screwdriver can be performed horizontally, from the front or the side for example, or vertically from underneath as indicated in FIG. 4.

With reference to FIGS. 6 to 9, the casing has a cylindrical screen or visor 112 on the axis 26, which is formed integrally with the side wall 28 of the moulded casing. The upper and lower faces of this screen are extensions of the outer and inner faces of the side wall of the casing. The screen 112 projects forward from the front edge 30, towards the glass 8, FIG. 1. The screen 112 extends over an angular sector about the axis 26 which is smaller than 90°, being in this example equal to 66°.

The intermediate member 6 has a cylindrical skirt on the axis 26, which is secured by its rear edge to the outside of the side wall 28 of the casing, and which carries the cover glass 8 on its front edge.

With reference to FIG. 1, the screen 112 is interposed radially between the lamp 12 under the screen, and the intermediate piece 6 over the screen. The screen extends forward further than the lamp. The screen protects the intermediate piece from air which is heated by the lamp and which rises into the internal space of the headlight.

The metal plate 4 will for example be of galvanised steel. The cover glass 8 may be of toughened glass. The intermediate piece 6, casing 2, cradle 16, adjusting screw 20 and knob 22 can be made of polybutylene terephthalate (PBT), a plastics material which has good heat resistance. The lamp may for example be a lamp of the H11 type, from Philips or Osram or GE. The reflector 18 in this example is of aluminium alloy plate. The lamp 12 may be provided with a mask 130 made of the material sold under the Trade Mark ALUZI. The seal 86 is preferably of silicone.

The invention may of course be applied to numerous modifications without departing from the scope of the invention. For example, the screen 112 may be a separate component which is attached for example on the casing 2 or on the intermediate piece 6. The light unit may be an indicating light such as a direction indicator.

What is claimed is:

1. A vehicle light comprising a casing, a reflector in the casing, and a cradle in the casing, the cradle connecting the reflector to the casing and having a central aperture defined so as to extend to a peripheral upper edge of the cradle.

2. A vehicle light according to claim 1 wherein the aperture includes a slot.

3. A vehicle light according to claim 1 further including means defined by the cradle and reflector, securing the cradle rigidly to the reflector.

4. A vehicle light according to claim 1, wherein the reflector and casing define means mounting the reflector on the casing for movement of the reflector with respect to the casing.

5. A vehicle light according to claim 1, wherein the reflector and the casing define means mounting the reflector for rotational movement with respect to the casing.

6. A vehicle light according to claim 1, wherein the cradle includes a screw thread element, the light further including an adjusting screw and means carried by the casing, and said cradle is configured with said screw thread element so as to mesh with said adjusting screw.

7. A vehicle light according to claim 1, further including a lamp and means mounting the lamp rigidly in the casing.

8. A vehicle light according to claim 1, further including a rear wall of plastics material, a lamp carrier fixed to the said rear wall, and a metal plate fixed to the said rear wall.

9. A vehicle light according to claim 1, further including a cover glass, an intermediate member joining the cover glass to the casing, and a screen, the casing defining an upper zone and the screen being mounted in the casing so as to extend forward from the said upper zone towards the cover glass.

10. A vehicle light according to claim 1, being a headlight for illumination purposes.

11. A vehicle light according to claim 1, being a foglight.

* * * * *